Feb. 24, 1959  W. C. STANDISH, JR  2,874,472
DEVICE FOR CIRCUMFERENTIALLY LOCATING MOLD LETTERING
Filed Jan. 25, 1957  2 Sheets-Sheet 1
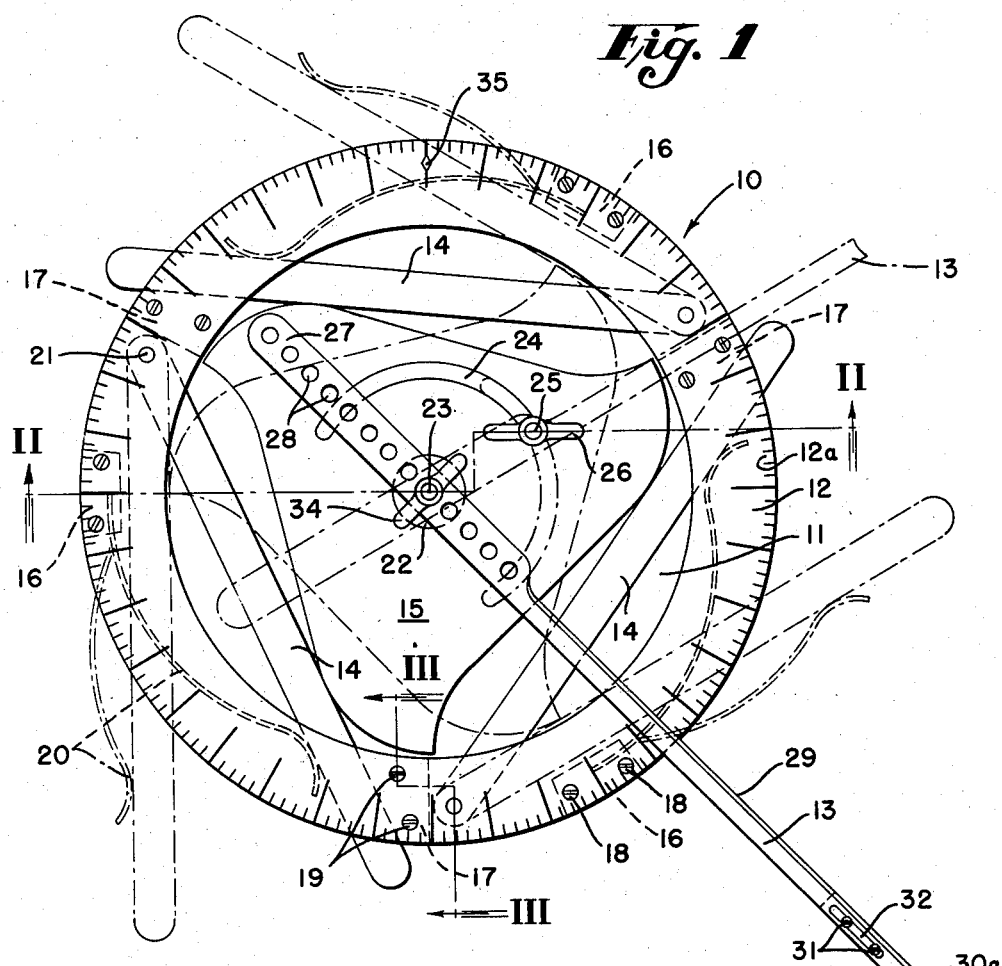
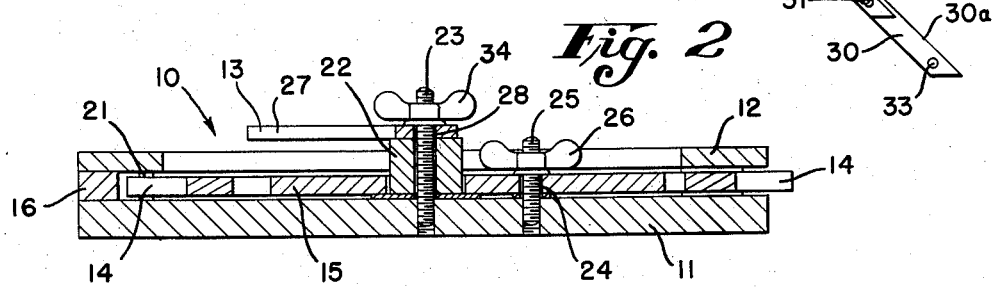
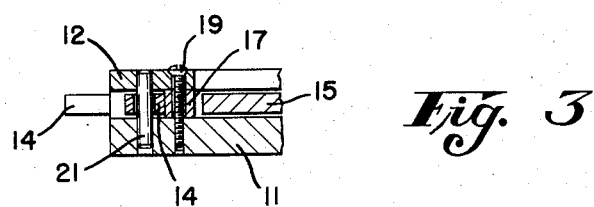
INVENTOR.
WILLIAM C. STANDISH, JR.
BY
Irwin M. Lewis
ATTORNEY.

INVENTOR.
WILLIAM C. STANDISH, JR.
BY Irwin M. Lewis
ATTORNEY.

2,874,472
Patented Feb. 24, 1959

2,874,472
DEVICE FOR CIRCUMFERENTIALLY LOCATING MOLD LETTERING

William C. Standish, Jr., Grosse Pointe, Mich., assignor to United States Rubber Company, New York, N. Y., a corporation of New Jersey Application January 25, 1957, Serial No. 636,291

1 Claim. (Cl. 33—21)

This invention relates to a device for determining the proper location and spacing of lettering or other indicia on a tire mold or other article of similar shape.

As is well known, the molded lettering appearing on the sides of rubber vehicle tires is formed by the flow of rubber during vulcanization into lettering engraved in the wall of the tire mold. To insure proper appearance of the molded lettering on the finished tire, the engraved lettering in the mold wall must be carefully located and spaced.

The present invention provides a device which may be used to quickly and accurately determine the location and spacing for such lettering in a tire mold.

The device of the present invention is described in detail by reference to the accompanying drawings wherein:

Fig. 1 is an elevational view of the device,

Fig. 2 is a sectional view taken on the line II—II of Fig. 1,

Fig. 3 is a sectional view taken on the line III—III of Fig. 1,

Figure 4:
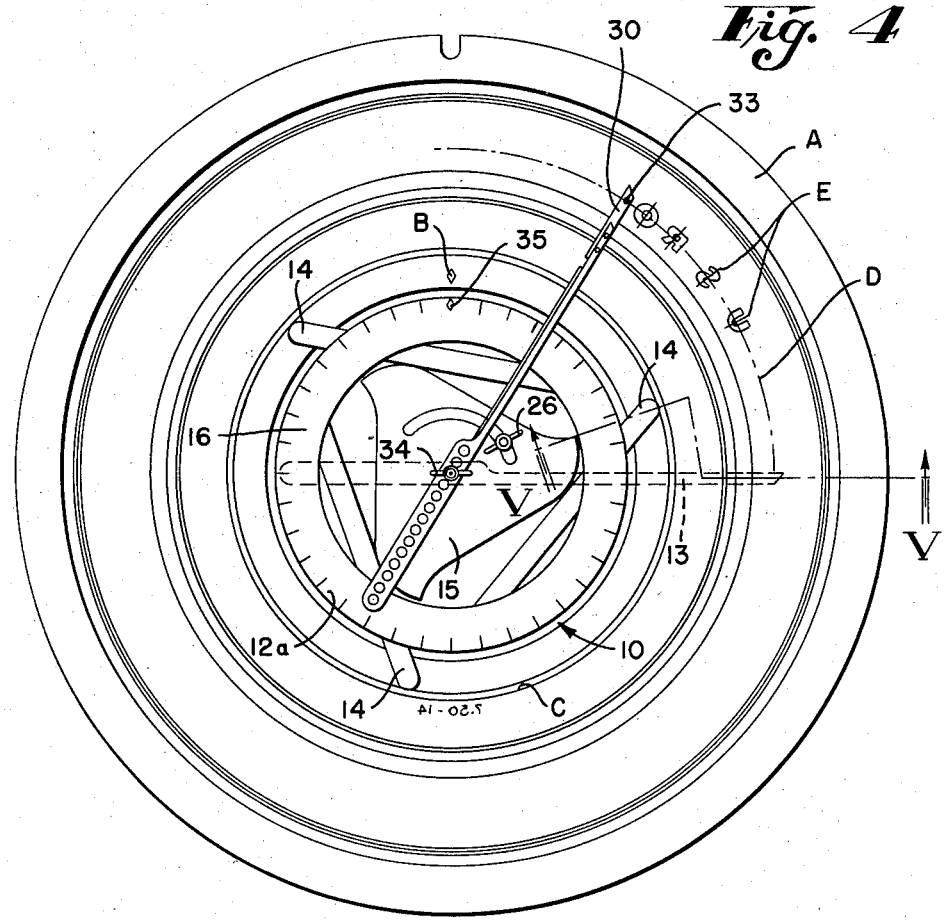
Fig. 4 is an elevational view of one half of a tire mold and the device of the present invention showing use of the device in determining proper location and spacing of lettering in the tire mold.

Referring to Figs. 1, 2 and 3, the device of the present invention, generally designated by the reference numeral 10, includes a base plate 11, a ring 12 provided with a circular graduated scale 12a, a rotatable arm 13, three centering arms 14, and a cam 15 for extending the arms 14 to center the device with respect to the tire mold. In Fig. 1, the arms 14 are shown in retracted position in full lines and extended position in dot-dash lines.

The base plate 11 and the ring 12 are assembled in spaced relationship to each other by means of spacer blocks 16 and 17 and held together by screws 18 and 19 which extend through the ring 12, blocks 16 and 17, and thread into base plate 11.

Each of the blocks 16 is provided with a spring clip 20 which is anchored at one end in a slot in the block 16 and engages at the other end the side of an arm 14 to urge the arm 14 against the cam 15.

Each arm 14 is pivotally mounted between the base plate 11 and the ring 12 at equally spaced points on a common circular center line by means of pin 21 which extends through one end of an arm 14 and has a press fit in an opening through the base plate 11 and the ring 12.

The cam 15, which engages the arms 14 and serves to simultaneously extend each of the three arms 14 upon rotation thereof, is rotatably mounted on a bushing 22. Bushing 22 fits over a stud 23 which is threaded into the base plate 11 at the geometric center of the graduated circular scale 12a. Cam 15 is provided with an arcuate slot 24 which is concentric with the stud 23. A stud 25 threaded into the base plate 11 extends up through the slot 24 and a wing nut 26 threaded onto the free end of the stud 25 serves to lock the cam 15 in any desired adjusted position. In Fig. 1, the cam 15 is shown in non-actuating position in full lines and in a partially actuated position in dot-dash lines.

Arm 13 is rotatably mounted on the stud 23. Arm 13 has a relatively wide portion 27 at one end thereof through which is drilled a plurality of equally spaced holes 28 which may be selectively placed over the stud 23 to provide rough adjustment in the effective length of the arm 13. The opposite end of the arm 13 is narrow to provide an edge 29 which is radial to the center of the stud 23. The arm 13 has a radially extensible end portion 30 to provide for fine adjustments in the effective length of the arm 13. Adjustability of the end portion 30 is provided by means of a slot 32 in the arm 13 through which spaced screws 31 thread into the extension 30. Edge 30a of the extension 30 forms an extension of the edge 29. A hole 33 in end portion 30 is provided to receive a suitable scriber. If desired, the end portion 30 may be marked with graduations (not shown) to indicate the effective length between the center of hole 33 and the center of stud 23. A wing nut 34 threaded onto the end of stud 23 serves to lock the arm 13 in any desired angular position.

Figure 5:
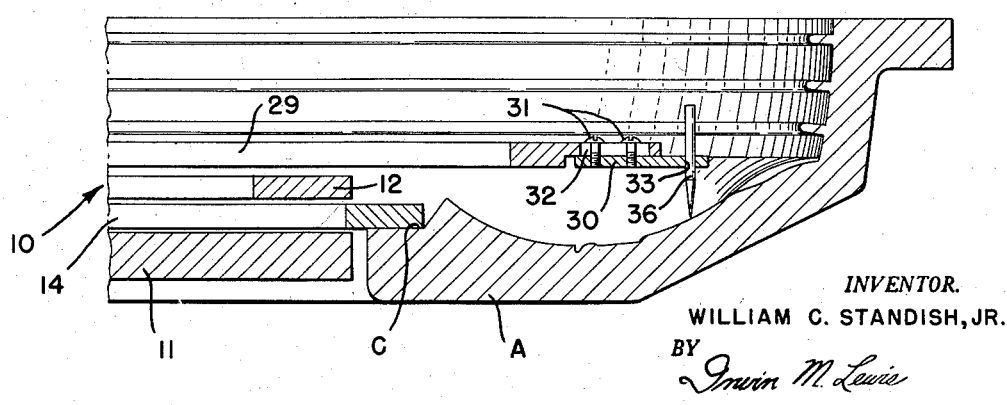
Fig. 5 is a partial sectional view taken on the line V—V of Fig. 4.

In Figs. 4 and 5, the device of the invention is shown being used to determine proper location and spacing of lettering to be engraved in the wall of a tire mold shell half A. In using the device, the device, with the arms 14 retracted, is placed in the circular opening of the tire mold half. The zero designation 35 of the graduated circular scale 12a is aligned with a predetermined mark B on the mold half and the arms 14 extended by rotation of the cam 15 until they engage a flange C of the mold A. Flange C constitutes a part of the toe ring register. Engagement of the arms 14 with the flange C results in centering of the device with respect to the mold half A. When the device is so centered, wing nut 26 is tightened to lock the cam 15.

Arm 13 is next adjusted to the desired length and a suitable scriber, such as shown at 36 in Fig. 5 is inserted through hole 33. Arm 13 is then rotated around stud 23 to scribe a circular center line D.

The device is used to provide radial center lines for the letters, as indicated at E, by moving the arm 13 to the desired angular position, locking the arm 13 in such position by tightening wing nut 34 and scribing a radial line by using the edge 30a as a guide. Proper location and spacing circumferentially is obtained by aligning the edge 29 of arm 13 with the desired graduation on the graduated scale 12a of the ring 12.

From the above description, it can be seen that there is provided a device for quickly and accurately determining proper location and spacing of lettering on an annular article. While the device has been described in conjunction with the locating and spacing of lettering on the wall of a tire mold, it will be appreciated that the device is useful in locating and spacing indicia on other similar shaped articles.

Having thus described my invention, what I claim and desire to protect by Letters Patent is:

A device for determining the proper location and spacing of lettering or other indicia on an annular article such as a tire mold comprising, a base member, means for centering said base member in the central opening of the annular article, a circular graduated scale on said base member, a scriber arm pivotally mounted at the geometric center of said scale in superposed relation thereto for rotation relative to said scale, a scriber carried by the outer free end of said arm, one edge of said arm being radial to the center of its pivotal mounting, said edge being adapted for alignment with the graduations on said scale to locate said arm in the desired circumferential position, said edge also acting as a guide for inscribing radial lines, and means for adjusting the effective length of said arm, whereby circular and radial lines may be inscribed on said article at accurately predetermined locations, for the purpose set forth, said means for centering said base member comprising at least three arms extendible from the outer periphery of said base member, each arm being pivotally secured to said member on a common circular center line at equally spaced points, a cam rotatably mounted at the geometric center of said scale for simultaneously extending said arms radially equal distances from the center of said scale upon rotation of said cam, means for resiliently urging said arms against said cam, and means for locking said cam against rotation.

References Cited in the file of this patent

UNITED STATES PATENTS

| | | |
|---|---|---|
| 1,454,710 | Brown | June 23, 1891 |
| 1,031,780 | Fine | July 9, 1912 |
| 1,679,931 | Covell | Aug. 7, 1928 |
| 2,325,362 | Black | July 27, 1943 |

FOREIGN PATENTS

| | | |
|---|---|---|
| 362,576 | Germany | Dec. 1, 1921 |
| 161,907 | Switzerland | Oct. 2, 1933 |